United States Patent [19]
Takahashi et al.

[11] 4,203,671
[45] * May 20, 1980

[54] METHOD OF DETECTING FLESH COLOR IN COLOR ORIGINALS

[75] Inventors: Koji Takahashi; Taizo Akimoto; Shigeru Watanabe, all of Minami-ashigara, Japan

[73] Assignee: Fuji Photo Film Co., Ltd., Minami-ashigara, Japan

[ * ] Notice: The portion of the term of this patent subsequent to Oct. 17, 1995, has been disclaimed.

[21] Appl. No.: 809,078

[22] Filed: Jun. 22, 1977

[30] Foreign Application Priority Data

Jun. 22, 1976 [JP] Japan .................................. 51/73576

[51] Int. Cl.² .............................................. G03B 27/76
[52] U.S. Cl. ...................................... 356/402; 355/77
[58] Field of Search ............... 356/173, 175, 176, 177, 356/195, 402, 404–406; 355/35–38, 77

[56] References Cited
U.S. PATENT DOCUMENTS

| 2,608,125 | 8/1952 | Hall | 356/177 X |
| 4,120,581 | 10/1978 | Takahashi et al. | 355/77 X |

Primary Examiner—John K. Corbin
Assistant Examiner—Bruce Y. Arnold
Attorney, Agent, or Firm—Gerald J. Ferguson, Jr.; Joseph J. Baker

[57] ABSTRACT

Red, green and blue densities of a number of points of a color negative or original are measured. If the measured values of the densities fall within an ellipsoid when plotted in a three dimensional coordinate system or within an ellipse when plotted in two-dimensional coordinate system the axes of which represent the red, green and blue densities or combinations of the three color densities, the measured point is determined to have flesh color. When the negative or original has more than a certain number of points of flesh color, it is determined that the principal subject matter of the negative or original is a human figure and the exposure in a printer is controlled to give a print having a desirable flesh color.

7 Claims, 5 Drawing Figures

METHOD OF DETECTING FLESH COLOR IN COLOR ORIGINALS

BACKGROUND OF THE INVENTION

1. Field of the Invention

This invention relates to a method of detecting flesh color in color originals, and more particularly to a method of detecting flesh color in photographic color originals in a photographic color printing process. This invention is applicable to a photographic color printer in which color photographs are printed from color originals of differing color balance and density. Based on the measured color balance and density of a point of flesh color in the original, the exposure is controlled in the printer to obtain color prints of high quality.

2. Description of the Prior Art

In determining exposure in color printers, various methods have been known and practically employed. A well-known printing system in which the printing light source intensity is adjusted during red, green and blue exposures to levels which will normalize the resulting integrated transmittances to a near-neutral color balance, i.e., "gray", is based on U.S. Pat. No. 2,571,697, Evans. This printing system produces satisfactory results from a large majority of the negatives of a given type of film. It has also been known in the art to adjust the rate of correction for red, green and blue exposures based on a linear combination of the red, green and blue large area transmission densities (LATD) of the original to be printed.

Since the above described conventional printing systems are based on the integrated transmission measurements conducted over the whole area of the original, the obtained prints are not always satisfactory. For instance, if the background of the principal subject matter is primarily red (red curtain or furniture), green (green grass or foliage) or blue (blue sky or water), color correction based only on the aforesaid LATD system is unsatisfactory. This problem is known as "color failure".

Further, if the background of the principal subject matter is of particularly high or low brightness, the conventional correction based on the integrated transmission density does not give satisfactory results. For example, when the principal subject matter has been photographed with a back light or in a spotlight conventional correction will give unsatisfactory results. This is known as "density failure".

According to the inventors' tests, in the color printing process using the LATD printing system the yield of satisfactory prints is about 70% of all the prints obtained.

It has also been known in the prior art to determine the exposure in a color printer based on the measured densities of divided areas of color originals in which the entire area of the original is divided into upper and lower, right and left, and central and peripheral sections. The exposure is determined based on a combination of the LATD and the densities of the divided areas. In this system, the yield of satisfactory prints is somewhat raised. However, since the density of the principal subject matter is not accurately measured in this system, the correction is not always effected in the most desirable manner.

According to the inventors' investigation, about 80% of the color originals have figures as the principal subject matter. Further, in looking at printed color photographs, it is well known that most people are concerned about the faces of the figures. Therefore, in printers, it is desirable that the faces of the figures be printed in a good condition. An exposure controlled to obtain a good flesh color in the areas of flesh color might be improper for areas other than the flesh color areas. However, even so, the yield of satisfactory prints is higher, if the exposure control is based on the flesh color areas.

Thus, it is proposed to print color originals based on the flesh color areas when the originals contain over a certain number of points of flesh color. If the originals have no areas of flesh color, the exposure may be controlled according to the conventional LATD printing system or the like. In order to carry out this method, it is necessary first to detect flesh color in the color original.

SUMMARY OF THE INVENTION

It is, therefore, the primary object of the present invention to provide a method of detecting flesh color in color originals.

It is another object of the present invention to provide a method of detecting flesh color at a high speed.

It is still another object of the present invention to provide a method of detecting flesh color automatically.

In accordance with the method of the present invention, flesh color is defined as one whose red, green and blue densities fall within an ellipse when plotted in a two-dimensional coordinate system or within an ellipsoid when plotted in a three-dimensional coordinate system the axes of which represent the red, green and blue densities or combinations of the densities of red, green and blue. When the measured color is contained in the ellipse or ellipsoid, the color is assumed to be flesh. The area of the flesh color defined as above can be represented by a formula. The measured red, green and blue densities are put into the formula and it is determined whether or not the color of the measured point is flesh. According to the inventors' tests, when the present invention was applied in a printing system and control of the printing of the negatives containing flesh areas was based on the densities in the flesh areas to reproduce the desirable flesh color, the yield of satisfactory prints was as high as 97%.

DESCRIPTION OF THE PREFERRED EMBODIMENTS

According to the tests conducted by the present inventors, it has been proved possible to define flesh color by an ellipse in a two-dimensional coordination system, or an ellipsoid in a three-dimensional coordination system. The area which defines the flesh color for improving the yield in the color printing system should contain almost all colors which can be referred to as flesh color and should never include a color which cannot be referred to as flesh color. Further, such area should be clearly defined.

The present inventors measured 169 points of flesh color in a number of color negatives by means of a Macbeth densitometer. The size of the scanning spot was 1 mm in diameter. The densities of the red, green and blue components of the points measured are shown in Table I below wherein R, G and B show the red, green and blue component densities respectively. The data of samples No 51 to No. 168 are omitted to save space.

Table I

| No. | B | G | R | $dS^2$ |
|---|---|---|---|---|
| 1 | 0.85 | 0.94 | 0.96 | 0.71 |
| 2 | 0.55 | 0.61 | 0.66 | 1.13 |
| 3 | 0.59 | 0.74 | 0.77 | 4.44 |
| 4 | 1.11 | 1.18 | 1.13 | 2.34 |
| 5 | 1.16 | 1.26 | 1.23 | 2.79 |
| 6 | 0.95 | 1.10 | 1.11 | 3.81 |
| 7 | 1.02 | 1.12 | 1.15 | 1.73 |
| 8 | 1.18 | 1.27 | 1.28 | 2.55 |
| 9 | 1.09 | 1.20 | 1.22 | 2.51 |
| 10 | 0.79 | 0.78 | 0.83 | 1.40 |
| 11 | 1.04 | 1.08 | 1.12 | 1.49 |
| 12 | 0.81 | 0.83 | 0.93 | 3.86 |
| 13 | 0.74 | 0.83 | 0.90 | 1.01 |
| 14 | 0.64 | 0.71 | 0.77 | 0.59 |
| 15 | 0.61 | 0.70 | 0.77 | 1.01 |
| 16 | 0.73 | 0.67 | 0.66 | 3.85 |
| 17 | 0.89 | 0.83 | 0.75 | 6.51 |
| 18 | 0.78 | 0.69 | 0.65 | 6.38 |
| 19 | 0.76 | 0.65 | 0.62 | 7.48 |
| 20 | 0.79 | 0.72 | 0.73 | 3.58 |
| 21 | 0.82 | 0.79 | 0.84 | 2.31 |
| 22 | 0.44 | 0.53 | 0.60 | 2.12 |
| 23 | 0.65 | 0.67 | 0.71 | 0.76 |
| 24 | 0.81 | 0.77 | 0.77 | 2.00 |
| 25 | 0.72 | 0.73 | 0.73 | 1.31 |
| 26 | 0.57 | 0.57 | 0.57 | 3.39 |
| 27 | 0.61 | 0.63 | 0.66 | 1.22 |
| 28 | 0.70 | 0.73 | 0.74 | 0.93 |
| 29 | 1.20 | 1.30 | 1.29 | 2.82 |
| 30 | 0.31 | 0.42 | 0.56 | 4.27 |
| 31 | 1.13 | 1.03 | 1.01 | 5.20 |
| 32 | 0.66 | 0.63 | 0.66 | 2.24 |
| 33 | 0.68 | 0.73 | 0.80 | 0.70 |
| 34 | 0.95 | 0.99 | 1.04 | 1.14 |
| 35 | 0.88 | 0.91 | 0.94 | 0.15 |
| 36 | 0.95 | 0.92 | 0.98 | 3.80 |
| 37 | 1.14 | 1.14 | 1.21 | 6.40 |
| 38 | 0.97 | 0.98 | 1.05 | 3.28 |
| 39 | 0.81 | 0.92 | 0.97 | 1.27 |
| 40 | 1.05 | 1.13 | 1.15 | 1.20 |
| 41 | 0.38 | 0.50 | 0.53 | 5.99 |
| 42 | 0.54 | 0.66 | 0.78 | 3.21 |
| 43 | 0.67 | 0.73 | 0.80 | 0.67 |
| 44 | 0.99 | 1.07 | 1.19 | 8.20 |
| 45 | 1.16 | 1.35 | 1.38 | 8.58 |
| 46 | 1.60 | 1.60 | 1.44 | 9.32 |
| 47 | 1.32 | 1.37 | 1.33 | 2.49 |
| 48 | 1.52 | 1.53 | 1.37 | 9.48 |
| 49 | 1.42 | 1.46 | 1.36 | 4.89 |
| 50 | 1.45 | 1.43 | 1.33 | 4.42 |
| . | . | . | . | . |
| . | . | . | . | . |
| . | . | . | . | . |
| 169 | 0.42 | 0.49 | 0.54 | 2.70 |

Figure 1:
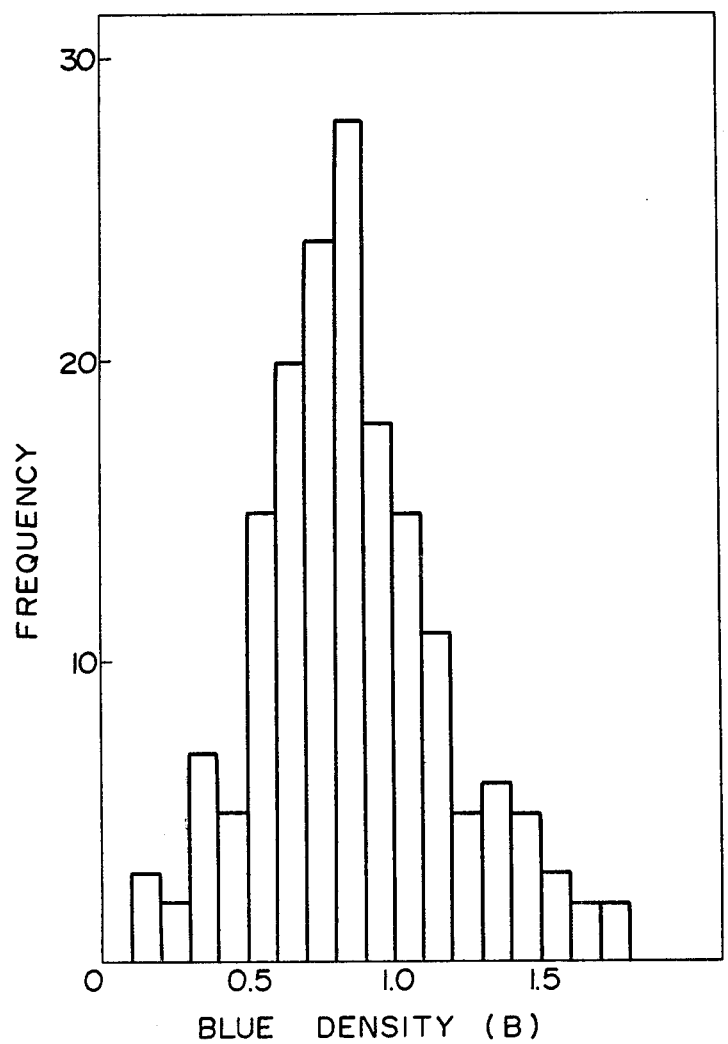
FIG. 1 is a histogram showing the distribution of blue components of different densities in a flesh color.

In the above Table I, $dS^2$ is a value which is used to define flesh color as described in detail hereinafter. The relation between the density of the blue density B and the frequency (rate of occurence) of the density in Table I is shown in the histogram of FIG. 1. From the histogram, it can be seen that the blue densities B have substantially a Gaussian distribution. The average blue density was 0.862. Similar histograms were obtained for the green and red densities, and the average densities were 0.903 and 0.923, respectively.

From the above results, it may be concluded that the red, green and blue densities R, G and B have three dimensional Gaussian distributions about a central point of $(\bar{R},\bar{G},\bar{B})$ which represents the three average values of the red, green and blue densities. Since the three Gaussian distributions are not identical with each other, the red, green and blue densities of flesh color exist within an ellipsoid having its center at the coordinate of the average values of the three densities.

The ellipsoid or ellipse is represented by the following general formula.

$$dS^2 = \sum_{i,j=1}^{n} a_{ij} x_i x_j \qquad (1)$$

where $a_{ij}$ is a constant and $$x_1 = B - \bar{B}, \; x_2 = G - \bar{G}, \text{ and } x_3 = R - \bar{R}.$$

In the above formula, when n is 2 the formula represents an ellipse, and when n is 3 the formula representes an ellipsoid.

Therefore, in case of an ellipsoid, the formula can be converted as follows.

$$dS^2 = C_{11}dB^2 + 2C_{12}dB \cdot dG + C_{22}dG^2 + \qquad (2)$$
$$2C_{23}dG \cdot dR + C_{33}dR^2 + 2C_{31}dR \cdot dB$$

Since $dB = x_1$, $dG = x_2$ and $dR = x_3$, $$dB = B - \bar{B}, \; dG = G - \bar{G} \text{ and } dR = R - \bar{R}.$$

In the formula (2), $C_{ij}$ is an element of an inverse matrix of the following variance-covariance matrix.

$$A = \begin{bmatrix} \text{Var}(B) & \text{Cov}(B,G) & \text{Cov}(R,B) \\ \text{Cov}(B,G) & \text{Var}(G) & \text{Cov}(G,R) \\ \text{Cov}(R,B) & \text{Cov}(G,R) & \text{Var}(R) \end{bmatrix}$$

where $$\text{Var}(B) = \frac{1}{N-1} \sum_{i=1}^{N} (B_i - \bar{B})^2$$

$$\text{Var}(G) = \frac{1}{N-1} \sum_{i=1}^{N} (G_i - \bar{G})^2$$

$$\text{Var}(R) = \frac{1}{N-1} \sum_{i=1}^{N} (R_i - \bar{R})^2$$

$$\text{Cov}(B,G) = \frac{1}{N-1} \sum_{i=1}^{N} (B_i - \bar{B})(G_i - \bar{G})$$

$$\text{Cov}(G,R) = \frac{1}{N-1} \sum_{i=1}^{N} (G_i - \bar{G})(R_i - \bar{R})$$

$$\text{Cov}(R,B) = \frac{1}{N-1} \sum_{i=1}^{N} (R_i - \bar{R})(B_i - \bar{B})$$

wherein N is the number of sample points, i.e. 169 in this case, and $B_i$, $G_i$ and $R_i$ are densities of the respective colors at the flesh color points.

Figure 2:
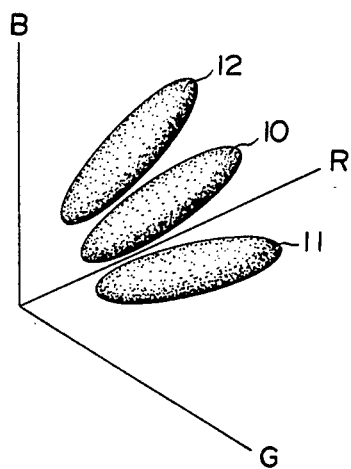
FIG. 2 is a three-dimensional coordinate system showing an ellipsoid which defines a flesh color.

In formula (1), the size of the ellipsoid changes according to the value of $dS^2$. If the ellipsoid is large, the flesh color area will contain all color points but will cover non-flesh colors too. In this case, flesh color will always be detected as such, but on the other hand non-flesh color will also be detected as flesh color. If the ellipsoid is too small, the discrimination will become too fine and there will occur some cases in which flesh color is detected as non-flesh color. When the value $dS^2$ was selected so that 95% of the input data relating to the 169 points would be contained in the ellipsoid 10 as shown in FIG. 2, the value of $dS^2$ became 7.81. In this case, $$\overline{B} = 0.862, \overline{G} = 0.903, \overline{R} = 0.923, \text{ and}$$

$$C_{ij} = \begin{bmatrix} 310.1 & -486.4 & 197.7 \\ -486.4 & 1150.4 & -745.5 \\ 197.7 & -745.5 & 629.5 \end{bmatrix}$$

The above results were obtained with reference to color negatives photographed under daylight condition. When the color negatives were photographed under different illumination conditions such as tungsten light or fluorescent light, the distributions of the three color densities shifted from those of the negatives photographed under daylight condition. For instance, the area of the flesh color shifted from 10 to 11 in the case of negatives photographed under fluorescent light as shown in FIG. 2. In case of negatives photographed under tungsten light, the flesh color area 10 shifted to area 12. Since the distribution of the densities in the flesh color area differs relative to the illumination source, the kind of illumination source can be known by checking in what ellipsoidal region the measured densities are contained. The proper color correction can be made according to the kind of illumination.

Further, in the case of black people, it has been surprisingly found according to the inventors' tests that there is no shift in the flesh color region as in the case of the source of illumination. In this case, the luminosity of the flesh color is lowered, but there is no change in the color balance. The flesh color region in case of the yellow people, such as Japanese, was found to be substantially the same as that of white people.

In the present invention, the terms "ellipse" and "ellipsoid" should be broadly interpreted to include the circle and the sphere. When the red, green and blue densities are used for the three axes of the three-dimensional rectangular coordinates, the flesh color can be defined by an ellipsoid as mentioned above. However, if combinations of the three color densities are used for the three axes, the flesh color is defined by a solid which is not an ellipsoid but has an elliptical cross section. Therefore, broadly, the flesh color can be defined by a solid which has an elliptical cross section in a three-dimensional coordinate system having three axes representing the red, green and blue densities respectively or three axes each representing the combination of these densities. In a two-dimensional coordinate system, the flesh color can be defined by an ellipse. The two axes of the two-dimensional coordinate system may represent two kinds of color density ratios or differences based on the primary three color densities, as will be described in detail hereinafter.

Now a preferred embodiment of the present invention will be described in detail. Flesh color is detected in a color negative film having an image frame size of 24 mm×36 mm. A flying spot scanner having a flying spot of 1 mm diameter is used to scan the film at intervals of 1 mm. Therefore, 748 points (24×36) are sampled. In order to check if the color of a sampled point is a flesh color, the red, green and blue densities R, G and B at the point are put into the foregoing formula (2) to see if the value of the formula ($dS^2$) is within the range of the above defined flesh color, i.e. 7.81. That is, the formula (2) can be rewritten as follows.

$$dS^2 = 310.1(B-0.862)^2 - 972.8(B-0.862)(G-0.903) \quad (3)$$
$$+ 1150.4(G-0.903)^2 - 1490.0(G-0.903)(R-0.923)$$
$$+ 629.5(R-0.923)^2 + 395.4(R-0.923)(B-0.862)$$

When the measured densities R, G and B are put into this formula and the value of $dS^2$ becomes $dS^2 \leq 7.81$, the color of the point is a flesh color, and if, $dS^2 > 7.81$, the color is not a flesh color.

In practical measurement, the output of the flying spot scanner may be recorded on a magnetic tape and the recorded tape can be checked through an electronic computer. The recorded output given by the flying spot scanner should be converted to the Macbeth density in this case.

In the practical application of the present invention to a color printing system, the number of points which are detected as being flesh color should be counted to determine if the principal subject matter is a human figure. If the counted number is too small, the principal matter is not a human figure but may be a scene or something else. Only when it is determined that the principal subject matter is a human figure that is of flesh color, is it preferred to control the exposure of the printer to reproduce a desirable flesh color. When it is determined that the principal subject matter is a human figure, the average densities $\overline{R}$, $\overline{G}$ and $\overline{B}$ of the color negative or original are used for reproducing the principal subject matter in a desirable, predetermined density and color balance. Thus, desirable prints without color failure or density failure can be obtained.

Figure 3:
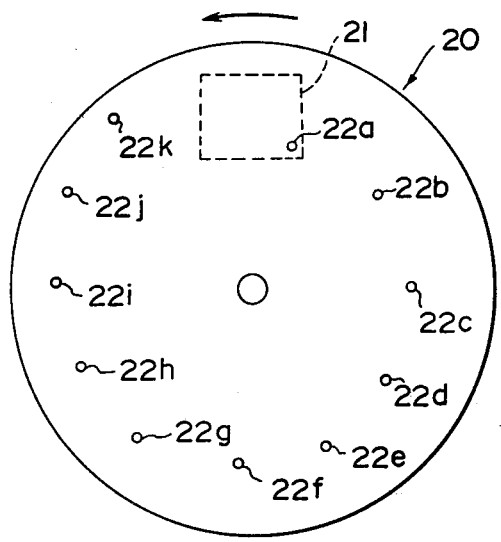
FIG. 3 is a plan view of a rotatable disc for scanning a color original.

Instead of the flying spot scanner, a rotatable disc as shown in FIG. 3 can be used to scan the original. The rotatable disc 20 has a number of angularly spaced light passing perforations 22a to 22k each at different distance from the center of rotation thereof. The rotatable disc 20 has a read-out perforation for synchronizing the read out timing with the rotation thereof. The read-out perforation may be provided on the periphery of the disc. Instead of the read-out perforation, a position detector may be provided in a member which is rotated in synchronization with the rotatable disc 20. As the disc 20 rotates, the light passing perforations 22a to 22k scan the color negative film 21 from the lower part to the upper part thereof as shown in FIG. 3. The first perforation 22a scans the lowermost part of the color negative 21 and the last perforation 22k scans the uppermost part thereof. As the disc 20 rotates and the perforations 22a to 22k scan the negative 21, the densities of a number of points of the negative along scanning lines are measured at equal time intervals of sampling. The red, green and blue densities of the number of points sampled are measured and it is decided if the points are of flesh color based on the measured densities. When the point is determined to be flesh color, the output of the measuring means which measures the densities through said perforations is given to an exposure control means of the printer to conduct proper exposure control.

Further, instead of the flying spot scanner or the rotatable disc, a well-known line scanning raster device can be employed to measure the three color densities of a number of points of the negative or original. In this case, a thin light beam is used for scanning the original. Besides the above mentioned methods, various known methods can be employed for measuring the densities of the number of points of the color original.

Figure 4:
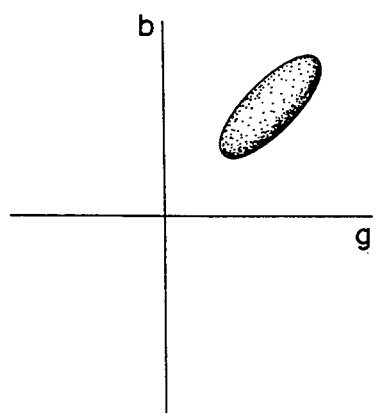
FIG. 4 is a graph which defines the area of flesh color based on ratios of densities of different colors.

With reference to FIG. 2, a definition of the flesh color by use of an ellipsoid has been described. Instead of the three-dimensional definition, the flesh color can be defined by use of an ellipse in a two-dimensional coordinate system in which the two axes of the coordinates represent density ratios or density differences. FIG. 4 shows a rectangular two-dimensional coordinates in which the two axes represent the density ratios between three color densities R, G and B which are formulated as follows.

$$r = \frac{R}{R+G+B}, g = \frac{G}{R+G+B} \text{ and } b = \frac{B}{R+G+B}$$

where $r+g+b=1$. In this case, the ellipse is defined by two independent variables.

Figure 5:
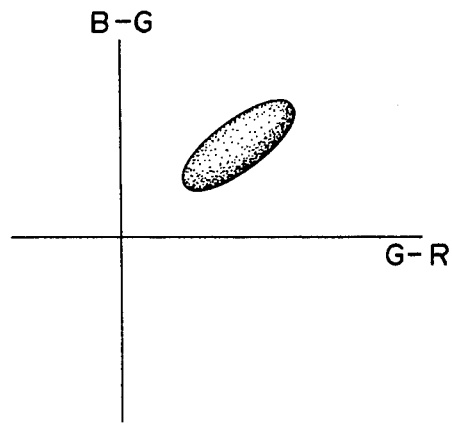
FIG. 5 is a graph which defines the area of flesh color based on differences of densities of different colors.

FIG. 5 shows a rectangular two-dimensional coordinate system in which the two axes represent the density differences between three color densities R, G and B which are represented by R-G, G-B and G-R. In this case also, the area of the flesh color can be defined by an ellipse.

In accordance with the present invention, it is easily determined if a negative or original has a human figure as principal subject matter. If a certain number of points, for instance 13 among 748 or more points, is decided to have flesh color, the negative or original is printed to give the principal subject matter a desirable flesh color, since it is determined in this case that the principal subject matter of the negative or original is a human figure.

We claim:

1. A method of detecting flesh color in a color original comprising defining a flesh color point as one whose red, green and blue densities fall within a solid having an elliptical cross section when plotted in a three-dimensional coordinate system the three axes of which represent the red, green and blue densities or combination thereof, measuring the red, green and blue densities of a number or points in the original, and determining that any given point is of flesh color when the measured red, green and blue densities are within said solid in the three-dimensional coordinate system.

2. A method of detecting flesh color as defined in claim 1 wherein said solid having an elliptical cross section is an ellipsoid.

3. A method of detecting flesh color as defined in claim 2 wherein said ellipsoid is defined by the following formula, and it is determined that the point is of flesh color when the value of the formula, $dS^2$, is not more than a predetermined constant value, and that the point is not flesh color when the value is more than the predetermined constant value;

$$dS^2 = \sum_{i,j=1}^{n} a_{ij} x_i x_j$$

where n is 2 or 3, $a_{ij}$ is a numerical constant, and $$x_1 = B - \overline{B}, x_2 = G - \overline{G} \text{ and } x_3 = R - \overline{R},$$

wherein B, G and R are blue, green and red densities of the measured point, and $\overline{B}$, $\overline{G}$ and $\overline{R}$ are average blue, green and red densities of all the measured points determined as being of flesh color.

4. A method of detecting flesh color as defined in claim 3 wherein said n is 3 and said predetermined constant value is 7.81.

5. A method of detecting flesh color in a color original comprising defining a flesh color point as one whose red, green and blue densities fall within an ellipse when plotted in a two-dimensional coordinate system the two axes of which represent combinations of red, green and blue densities, measuring the red, green and blue densities of a number of points in the original, and determining that any given point is of flesh color when the measured red, green and blue densities are within said ellipse.

6. A method of detecting flesh color as defined in claim 5 wherein the axes of the two-dimensional coordinate system represent ratios of densities between the red, green and blue densities.

7. A method of detecting flesh color as defined in claim 5 wherein the axes of the two-dimensional coordinate system represent differences between the red, green and blue densities.

* * * * *